(12) United States Patent
Prieto Sanchez et al.

(10) Patent No.: US 11,897,425 B2
(45) Date of Patent: Feb. 13, 2024

(54) STORAGE CONTAINER

(71) Applicant: Ford Global Technologies, LLC, Dearborn, MI (US)

(72) Inventors: Cesar Adolfo Prieto Sanchez, Mexico City (MX); Francisco Edgar Guizar, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 216 days.

(21) Appl. No.: 17/366,197

(22) Filed: Jul. 2, 2021

(65) Prior Publication Data
US 2023/0001856 A1 Jan. 5, 2023

(51) Int. Cl.
*B60R 5/04* (2006.01)
*B60R 15/02* (2006.01)

(52) U.S. Cl.
CPC ............... *B60R 5/04* (2013.01); *B60R 15/02* (2013.01)

(58) Field of Classification Search
CPC .. B60R 5/40; B60R 5/04; B60R 15/02; B60R 7/02
See application file for complete search history.

(56) References Cited

U.S. PATENT DOCUMENTS

| | | | | |
|---|---|---|---|---|
| 554,168 A * | 2/1896 | Beckwith | ................. | C11D 7/08 134/36 |
| 2,309,843 A * | 2/1943 | Greenspan | ............... | E03C 1/182 277/642 |
| 2,953,287 A * | 9/1960 | Werner | ..................... | B60R 5/04 312/28 |
| 4,785,483 A * | 11/1988 | Wise | ......................... | E03D 5/00 4/321 |
| 5,100,058 A | 3/1992 | Wei | | |
| 5,590,819 A * | 1/1997 | Armstrong | ............. | B60R 11/00 224/538 |
| 6,651,907 B2 | 11/2003 | Rodd | | |
| 6,889,877 B2 | 5/2005 | Bieker | | |
| 8,701,950 B2 | 4/2014 | Roach et al. | | |
| 9,126,548 B1 * | 9/2015 | Alneaimi | ................. | E03D 9/08 |
| 2007/0130684 A1* | 6/2007 | Watts | ...................... | B60R 15/02 4/596 |
| 2013/0025316 A1* | 1/2013 | Wheeless | ................. | F25D 3/08 62/441 |
| 2013/0168991 A1* | 7/2013 | Perakis | ..................... | B60R 5/04 296/37.14 |
| 2016/0082898 A1* | 3/2016 | Prestella | ............. | B62D 65/024 29/428 |
| 2016/0288719 A1* | 10/2016 | Sterling | .................... | B60Q 3/30 |

(Continued)

FOREIGN PATENT DOCUMENTS

| | | | | |
|---|---|---|---|---|
| GB | 2602937 | * | 7/2022 | ............... B60R 5/04 |
| KR | 1566761 | * | 11/2015 | ............... B60P 3/34 |

(Continued)

*Primary Examiner* — J C Jacyna
(74) *Attorney, Agent, or Firm* — Vichit Chea; Price Heneveld LLP

(57) ABSTRACT

A fluid storage system for a vehicle cargo area is provided that includes a container that includes a first container portion and a second container portion orthogonal to the first container portion. The fluid storage system further includes an attachment assembly that includes a container attachment affixed to the container and a vehicle attachment affixed to a vehicle.

13 Claims, 15 Drawing Sheets

(56) References Cited

U.S. PATENT DOCUMENTS

2018/0339659 A1* 11/2018 Davidson-Chmielewski ..............
                                                    B60R 7/02
2021/0293047 A1*  9/2021 Frederickson .......... B60P 3/341
2021/0401234 A1* 12/2021 Chance ................. B65D 85/72

FOREIGN PATENT DOCUMENTS

KR         200491960    *  7/2020  .............. B60R 5/04
RU         2412076 C2      2/2011

* cited by examiner

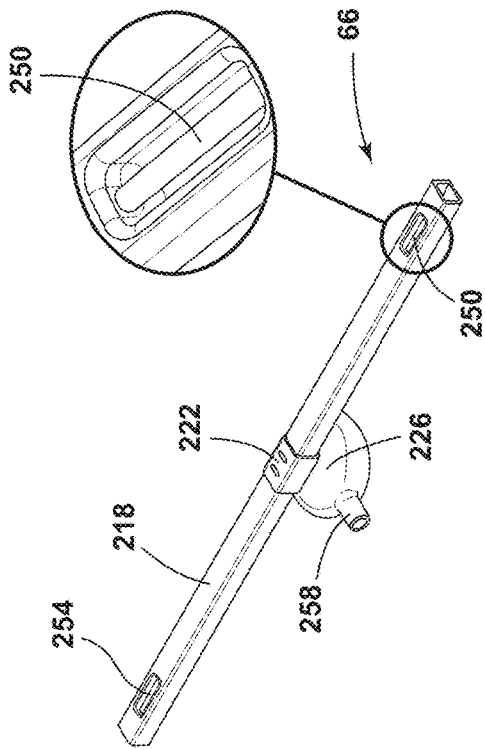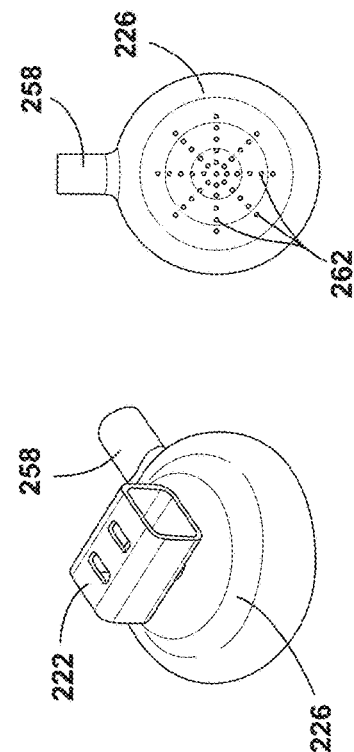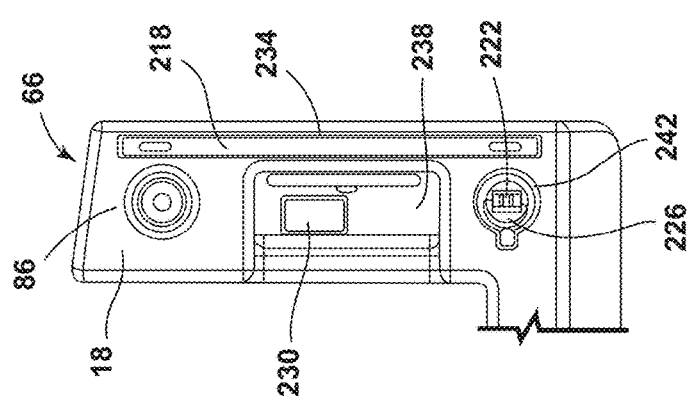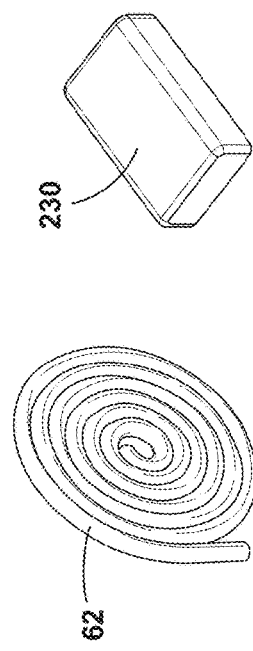
FIG. 6A  FIG. 6B  FIG. 6C  FIG. 6D  FIG. 6E  FIG. 6F

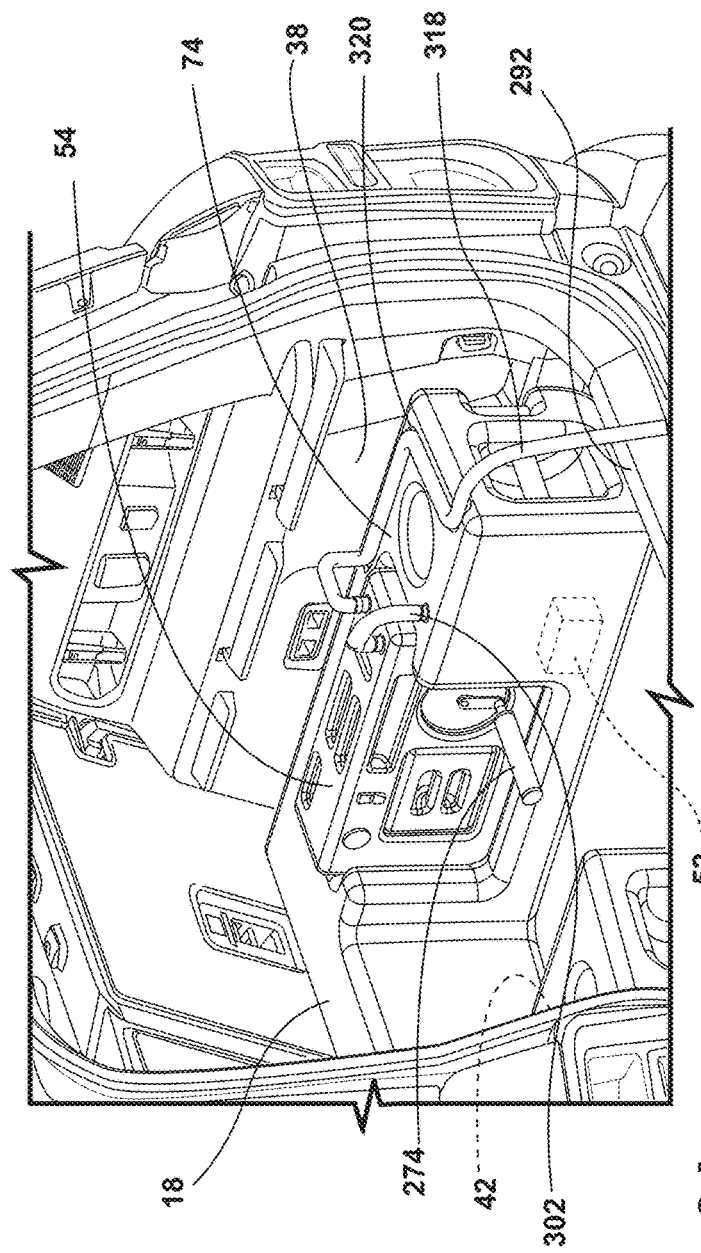
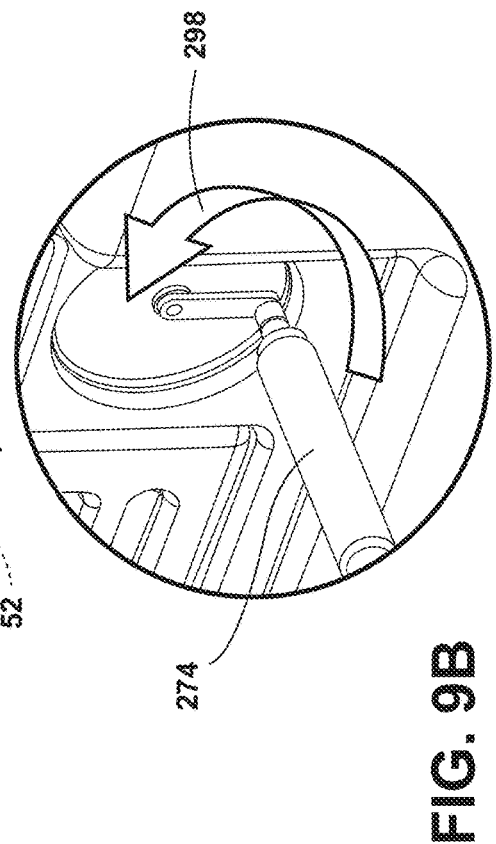
FIG. 9A
FIG. 9B

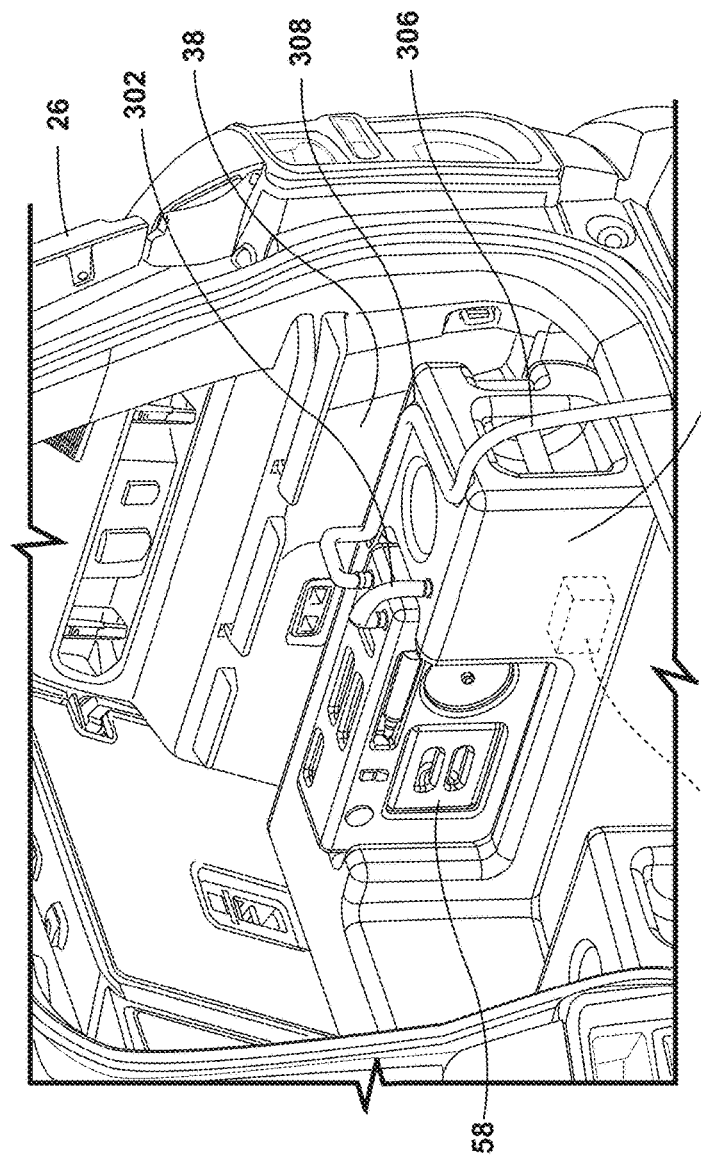
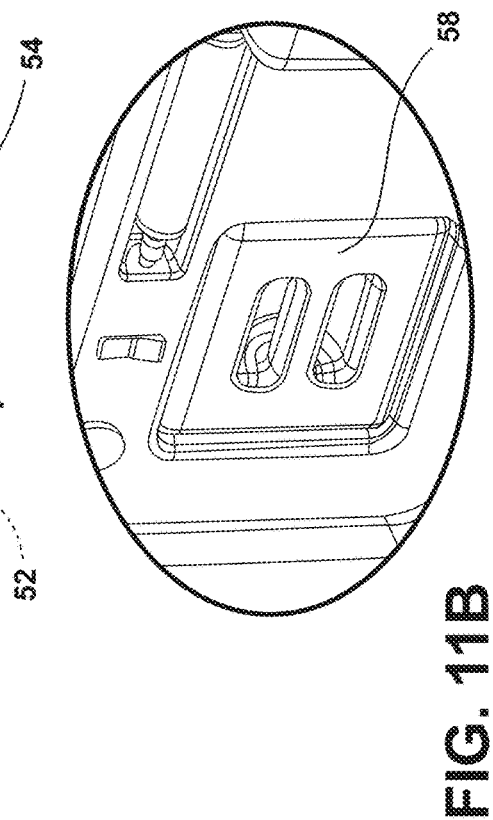
FIG. 11A
FIG. 11B

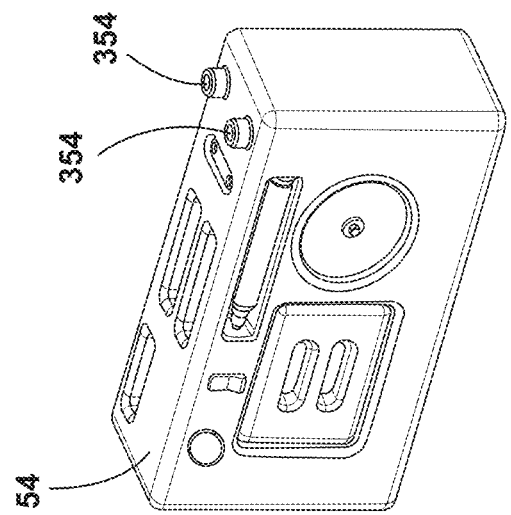
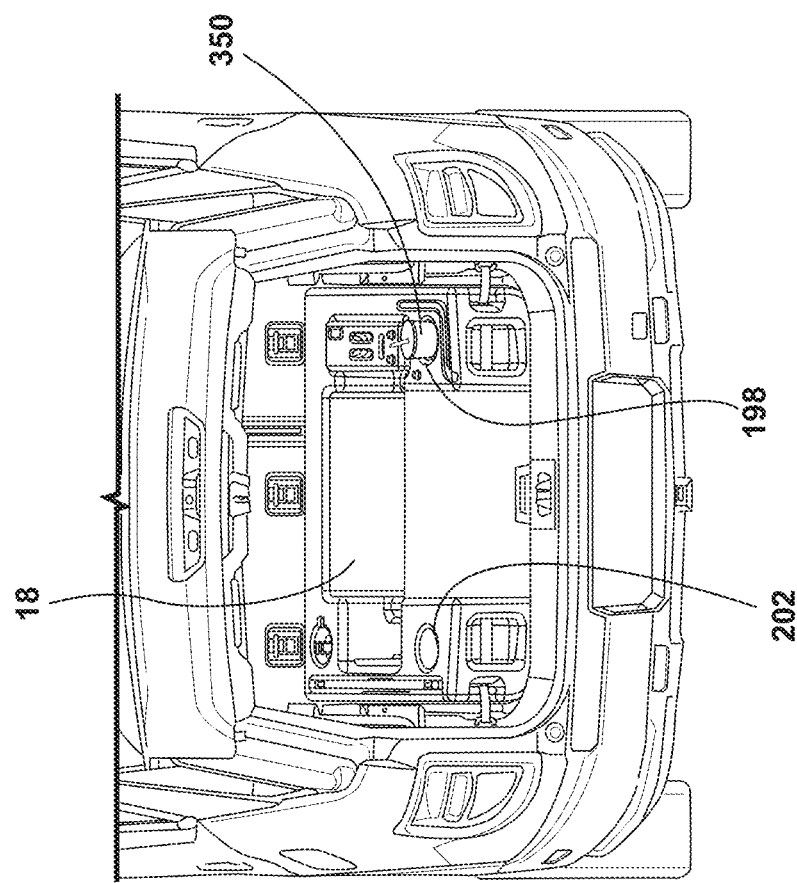
FIG. 15
FIG. 14

STORAGE CONTAINER

FIELD OF THE DISCLOSURE

The present disclosure generally relates to a storage container for a vehicle.

BACKGROUND OF THE DISCLOSURE

Vehicles may include storage containers. Storage containers may be used for a variety of storage needs. Storage containers may be used inside or outside of a vehicle. Storage containers may include various features. Storage containers may be disposed in various locations in vehicles.

SUMMARY OF THE DISCLOSURE

According to a first aspect of the present disclosure, a fluid storage system for a vehicle cargo area is provided. The fluid storage system includes a container that includes a first container portion and a second container portion orthogonal to the first container portion. The fluid storage system further includes an attachment assembly that includes a container attachment affixed to the container and a vehicle attachment affixed to a vehicle.

Embodiments of the first aspect of the present disclosure can include any one or a combination of the following features:
- a third container portion orthogonal to the first container portion;
- the second container portion extends away from the first container portion in a second direction and the third container portion extends away from the first container portion in a third direction;
- the second direction is substantially parallel to the third direction;
- the first, second, and third container portions have substantially rectangular cross-sections;
- the first container portion, the second container portion, and the third container portion are arranged in a U-shaped configuration;
- the second container portion and the first container portion are disposable against opposing walls of the vehicle cargo area;
- the first container portion is disposable against a seatback;
- the container attachment includes a fixing tube;
- the vehicle attachment includes a C-hook;
- the first container portion, the second container portion, and the third container portion are connected;
- a pump coupled to the container;
- a shower assembly coupled to the container;
- the shower assembly includes a shower head storable in a shower head recess of the container; and/or
- a privacy barrier selectively attachable to the vehicle.

According to a second aspect of the present disclosure, a storage system for a vehicle cargo area is provided. The storage system includes a removable container that includes a port and a container attachment. The storage system further includes a vehicle attachment disposed on the vehicle and a fastener positionable between the container attachment and the vehicle attachment.

Embodiments of the second aspect of the present disclosure can include any one or a combination of the following features:
- an outer surface of the container includes a substantially orthogonal container shape, an inner surface of the vehicle cargo area forms a substantially orthogonal cargo area shape, and the substantially orthogonal container shape is positionable adjacent to the substantially orthogonal cargo area shape;
- the substantially orthogonal container shape and the substantially orthogonal cargo area shape extend along opposing walls of the vehicle cargo area; and/or
- a shower assembly coupled to the container and a pump module coupled to the container.

According to a third aspect of the present disclosure, a storage system for a fluid is provided. The storage system includes a vehicle cargo area defined by a floor, a pair of opposing walls, a substantially vertical structure, and a projection disposed proximate an opening of the vehicle cargo area, a container disposed on the floor and extending between the substantially vertical structure and the projection and further extending between the pair of opposing walls, and a pair of attachment assemblies extending between the container and each of the pair of opposing walls.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIGS. 6A-6F include components of a shower assembly;

FIG. 6A is a top plan view of a portion of the container of FIG. 3 having a shower assembly, according to an aspect of the disclosure;

FIG. 6B is a perspective view of a tube, according to an aspect of the disclosure;

FIG. 6C is a perspective view of a receptacle according to an aspect of the disclosure;

FIG. 6D is a perspective view of a shower head, a sliding feature, and a cross member including fixing tubes, according to an aspect of the disclosure;

FIG. 6E is a perspective view of a shower head, a sliding feature, and an inlet, according to an aspect of the disclosure;

FIG. 6F is a bottom elevational view of a shower head, according to an aspect of the disclosure;

FIG. 9A is a side perspective view of the pump module configured to operate manually in a vehicle cargo area, according to an aspect of the disclosure;

FIG. 9B is a side perspective view of a lever of the pump module of FIG. 9A, according to an aspect of the disclosure;

FIG. 11A is a side perspective view of the pump module configured to operate electrically through the power bank of the pump module, according to an aspect of the disclosure;

FIG. 11B is a side perspective view of the power bank disposed in the pump module of FIG. 11A, according to an aspect of the disclosure;

FIG. 14 is a rear perspective view of the vehicle cargo area and a cup disposed in a cup holder of the container, according to an aspect of the disclosure;

FIG. 15 is a side elevational view of the pump module, according to an aspect of the disclosure;

DETAILED DESCRIPTION

Figure 1:
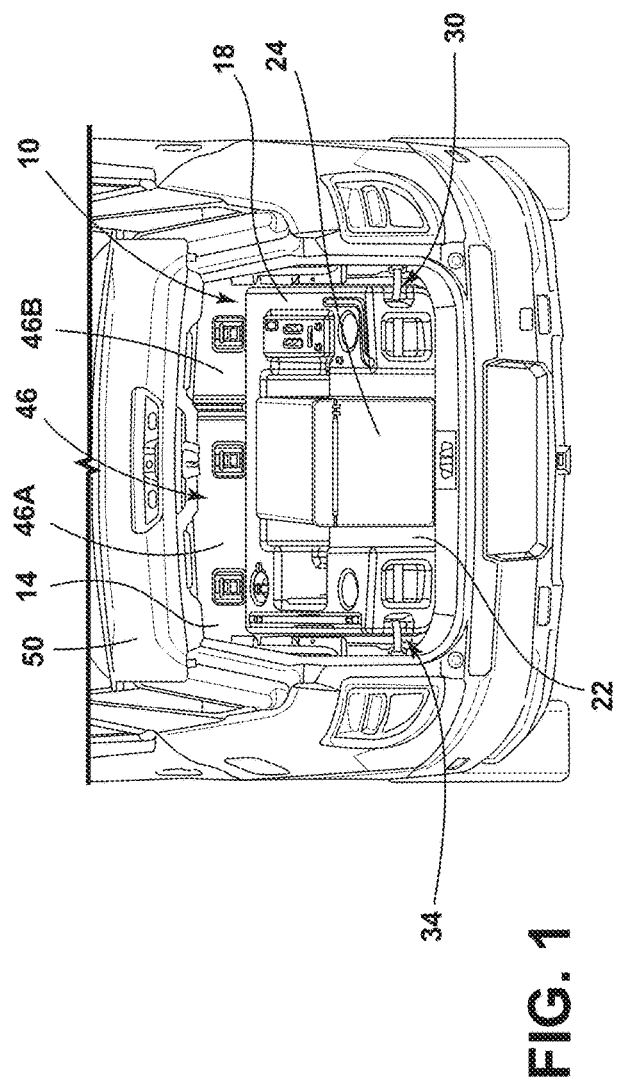
FIG. 1 is a rear perspective view of a container in a vehicle cargo area, according to an aspect of the disclosure.
Figure 2:
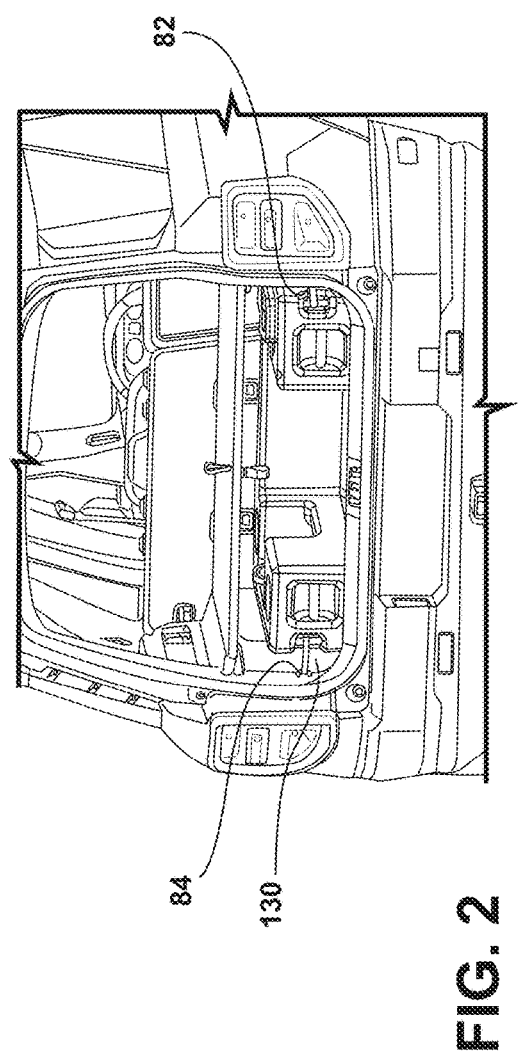
FIG. 2 is a rear side perspective view of a container in a vehicle cargo area, according to an aspect of the disclosure.

Referring to FIG. 1, a fluid storage system 10 may be disposed in a vehicle cargo area 14. The fluid storage system 10 may include a container 18. The container 18 may be disposed on a floor 22. A cargo box 24 may be disposed in the vehicle cargo area 14. The shape of the container 18 may allow the container 18 to extend around the outside of the vehicle cargo area 14 and to surround the cargo box 24. The container 18 may be secured to the vehicle 26 with attachment assemblies 30, 34 that may extend between the container 18 and the vehicle 26. The container 18 may be disposed adjacent the opposing walls 38, 42 of the vehicle cargo area 14. The vehicle cargo area 14 may be defined by opposing walls 38, 42 of the vehicle cargo area 14. The vehicle cargo area 14 may be further defined by a substantially vertical structure (for example, seatback 46) in the upright position and the tailgate 50 in the closed position. The vehicle cargo area 14 may also be defined by a projection 292 (FIGS. 8 and 9A) in the vehicle cargo area 14. The seatback 46 may include a bench seat 46A and a single seat 46B.

It may be desirable for a vehicle 26 to be equipped to receive a container 18 for storing water. The container 18 may be disposed in the vehicle 26 during trips that require water. Water may be used to wash pets, sports equipment (for example, mountain bikes), or camping gear. A pump module may pump water into and out of the container 18. A hose may be attached to the container 18. A shower assembly may be coupled to the container 18 and the pump module 54. The shower assembly 66 may be used for bathing. A pump 52 disposed in the pump module 54 may be powered electrically or manually. The pump 52 may be powered by a vehicle power source (for example, the vehicle battery). The pump module 54 may be removed from the vehicle 26. The container 18 may be used outside of the vehicle 26 as well as inside of the vehicle 26. As such, the container 18 may increase vehicle user satisfaction.

Referring to FIGS. 1-16B, a fluid storage system 10 for a vehicle cargo area 14 includes a container 18 having a first container portion 70 and a second container portion 74 orthogonal to the first container portion 70. The fluid storage system 10 for a vehicle cargo area 14 also includes an attachment assembly (for example, attachment assembly 30 or attachment assembly 34). The attachment assembly (for example, attachment assembly 30 or attachment assembly 34) includes a container attachment (for example, container attachment 78 or container attachment 80) affixed to the container 18 and a vehicle attachment (for example, vehicle attachment 82 or vehicle attachment 84) affixed to the vehicle 26. The container 18 may also include a third container portion 86 orthogonal to the first container portion 70.

Figure 3A:
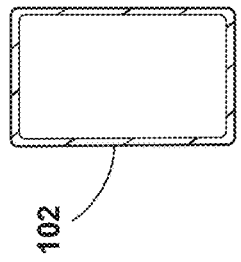
FIG. 3A is a cross-sectional view of the first container portion taken along IIIA-IIIA of FIG. 3, according to an aspect of the disclosure.
Figure 3B:
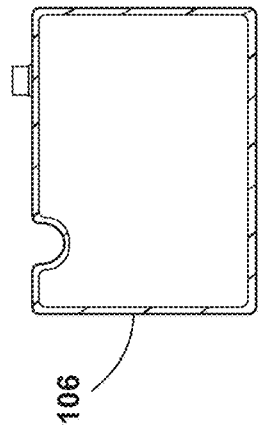
FIG. 3B is a cross-sectional view of the second container portion taken along IIIB-IIIB of FIG. 3, according to an aspect of the disclosure.
Figure 3C:
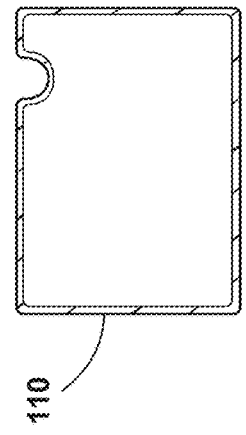
FIG. 3C is a cross-sectional view of the third container portion taken along IIIC-IIIC of FIG. 3, according to an aspect of the disclosure.
Figure 3:
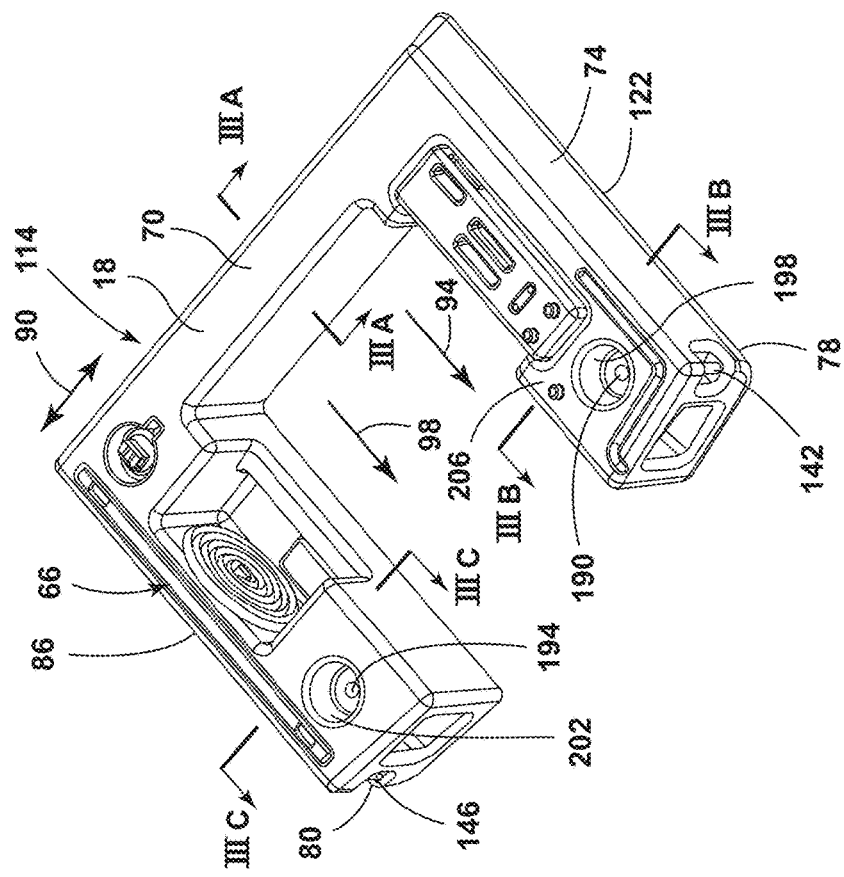
FIG. 3 is a top perspective view of a container, according to an aspect of the disclosure.
Figure 5:
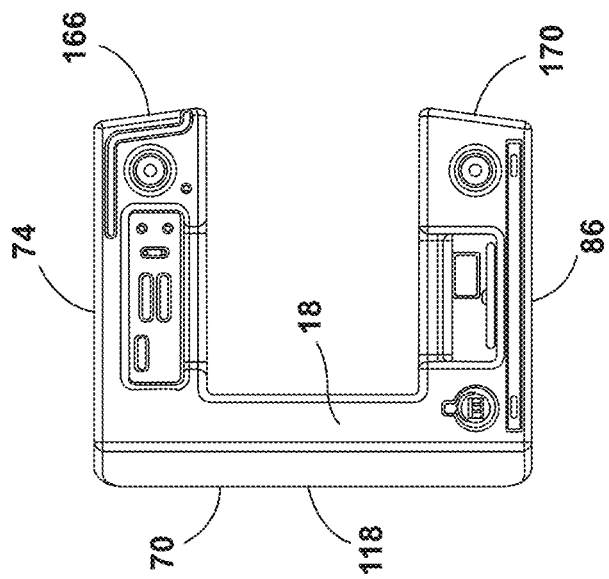
FIG. 5 is a top plan view of the container of FIG. 3, according to an aspect of the disclosure.
Figure 4:
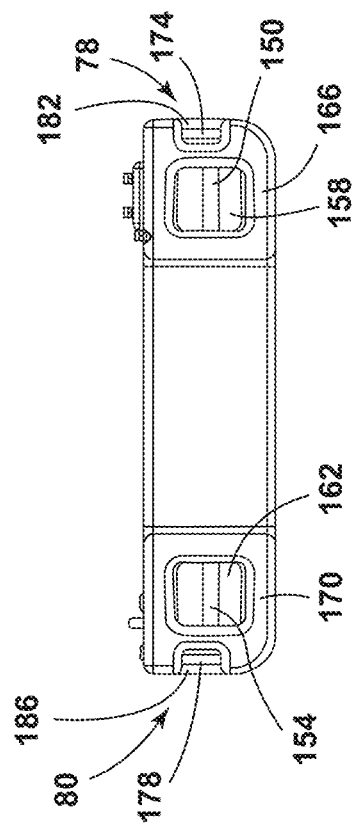
FIG. 4 is a front elevational view of the container of FIG. 3, according to an aspect of the disclosure.
Figure 7A:
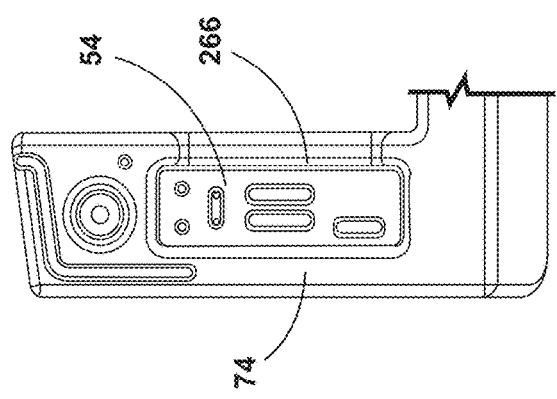
FIG. 7A is a top plan view of a portion of the container of FIG. 3 having a pump module, according to an aspect of the disclosure.
Figure 7B:
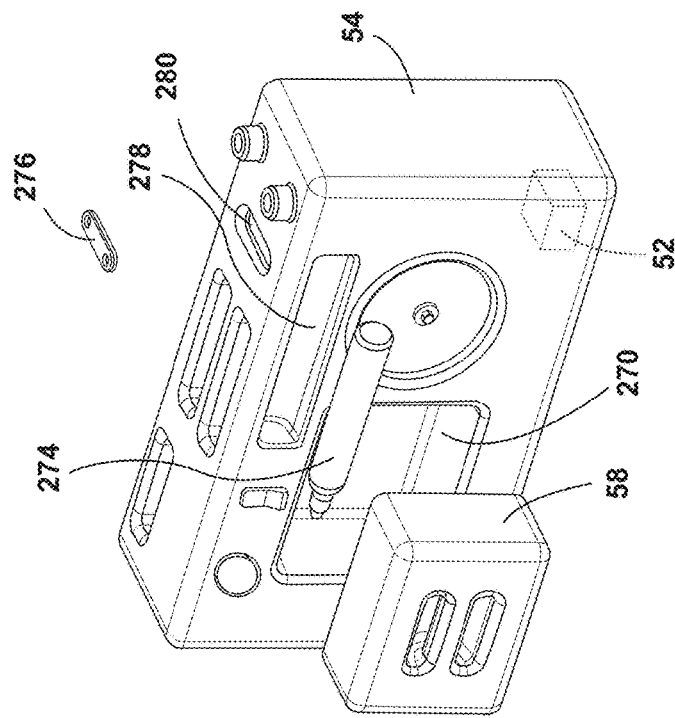
FIG. 7B is a side perspective view of the pump module, a power bank of the pump module, and a lever of the pump module, according to an aspect of the disclosure.
Figure 7C:
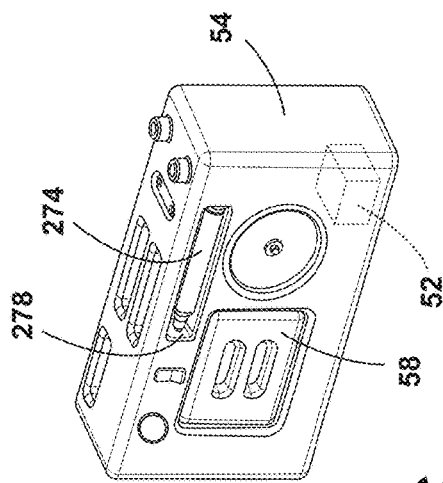
FIG. 7C is a side perspective view of the pump module configured to operate electrically, according to an aspect of the disclosure.
Figure 7D:
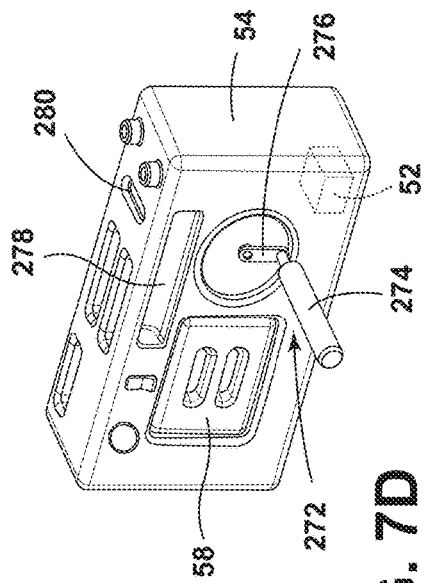
FIG. 7D is a side perspective view of the pump module configured to operate manually, according to an aspect of the disclosure.

Referring now to FIGS. 3-5, the container 18 may include the first container portion 70, the second container portion 74, and the third container portion 86. The first container portion 70 may be disposed in a first direction (designated by arrow 90). The second container portion 74 may extend away from the first container portion 70 in the second direction (designated by arrow 94). The third container portion 86 may extend away from the first container portion 70 in the third direction (designated arrow 98). In the example shown, the second direction and the third direction may be the same. The first container portion 70, the second container portion 74, and the third container portion 86 may each include a substantially rectangular cross section 102, 106, 110, respectively. The first container portion 70 may include a first substantially rectangular cross section 102. The second container portion 74 may include a second substantially rectangular cross section 106. The third container portion 86 may include a third substantially rectangular cross section 110. In the example shown, the first container portion 70, the second container portion 74, and the third container portion 86 may be arranged in a U-shaped configuration 114. The first container portion 70, the second container portion 74, and the third container portion 86 may form a unitary part in a U-shaped configuration 114. The container 18 may be referred to as a tank.

With continued reference to FIGS. 3-5, the container 18 may include outer corners (118, 122, 126 (FIGS. 16A and 16B)). The outer corners 118, 122, 126 may have substantially orthogonal shapes. The substantially orthogonal shapes of the outer corners 118, 122, 126 may extend along the edges of the first container portion 70, the second container portion 74, and the third container portion 86. The inner corners 130 extending along the vehicle cargo area 14 may include corresponding substantially orthogonal shapes. The inner corners 130 may include the corners defined by the wall 38 and the floor 22, the wall 42 and the floor 22, and the seatback 46 and the floor 22. As such, if the container 18 is placed in the vehicle cargo area 14, it may fit snugly in the vehicle cargo area 14. Foam, spacers, dampers, or other materials may be disposed between the container 18 and the vehicle cargo area 14 to minimize NVH (noise vibration harshness) of the container 18 in the vehicle cargo area 14 during vehicle use.

Referring again to FIGS. 3-5, the container 18 may include container attachments 78, 80 for securing the container 18 to the vehicle attachments 82, 84. The container attachments 78, 80 may include fixing loops 142, 146. Substantially horizontal fixing tubes 150, 154 may be disposed in recesses 158, 162 disposed at the distal ends 166, 170 of the second container portion 74 and the third container portion 86. Substantially vertical fixing tubes 174, 178 may be disposed in recesses 182, 186 in the distal ends 166, 170 of the second container portion 74 and the third container portion 86.

Referring to FIGS. 3-5, the container 18 may include ports 190, 194. Water may be poured into the ports 190, 194. The ports 190, 194 may be disposed at the bottoms of conical depressions 198, 202 in the top surface 206 of the container 18. The conical depressions 198, 202 may be used to receive water that may be poured into the container 18 through the ports 190, 194. The conical depressions 198, 202 may be used as cup holders. The conical depressions 198, 202 may minimize spillage of water on the container 18 when water is poured into the container 18 or extracted from the container 18 through the ports 190, 194.

Referring now to FIGS. 3-6F of the disclosure, the shower assembly 66 is shown disposed it the third container portion 86. The shower assembly 66 may include a cross member 218, a sliding feature 222, a shower head 226, and a shower hose 62. A receptacle 230 may be used store hose connectors and/or other items that may be used with the shower assembly 66. The cross member 218 may be stored in a cross member recess 234 in the container 18. The hose 62 may be stored in a storage space 238 disposed in the third container portion 86. The hose 62 may be wound into a substantially circular shape and suspended from a side of the storage space 238. The receptacle 230 may be stored in the storage space 238 disposed in the third container portion 86. The receptacle 230 may be disposed on the bottom surface of the storage space 238. The shower head 226 and the sliding feature 222 may be stored in a shower head recess 242 of the container 18. It is to be understood that the cross member recess 234, the storage space 238, and the shower head recess 242 may include features that may minimize the NVH (noise vibration harshness) associated with storage of components in the cross member recess 234, the storage space 238, and the shower head recess 242 during vehicle use. Such features may include surfaces or inserts with rubber, foam, and/or other dampening materials.

With continuing reference to FIGS. 3-6F, the shower assembly 66 may include a shower head 226, a sliding feature 222, a cross member 218, and a pair of fixing tubes 250, 254. The pair of fixing tubes 250, 254 may be used to suspend the shower assembly 66 from a vehicle tailgate 50 or other structure. The sliding feature 222 and the shower head 226 may be slidable along the cross member 218. The shower head 226 may include a water inlet 258. The shower head 226 may include holes 262 for dispensing water from the shower head 226.

Referring to FIGS. 3-5 and 7A-7D, a pump module 54 may be stored in a depression 266 of the second container portion 74. A stand-alone power source 58 may be stored in a power source recess 270 of the pump module 54. A lever assembly 272 may manually power the pump module 54. The lever assembly 272 may include a handle 274 and a lever 276. A handle 274 for manually powering the pump module 54 may be stored in a handle recess 278 of the pump module 54. The lever 276 may be stored in a lever recess 280 of the pump module 54. The pump module 54 may be snugly stored in the depression 266. The power source 58 may be stored in the power source recess 270 of the pump module 54, the handle 274 may be stored in the handle recess 278. It is to be understood that the depression 266, the power source recess 270, and the handle recess 278 may include features that may minimize the NVH (noise vibration harshness) associated with storage of components in the depression 266, the power source recess 270, and the handle recess 278 during vehicle use. Such features may include surfaces or inserts with rubber, foam, and/or other dampening materials.

Figure 8:
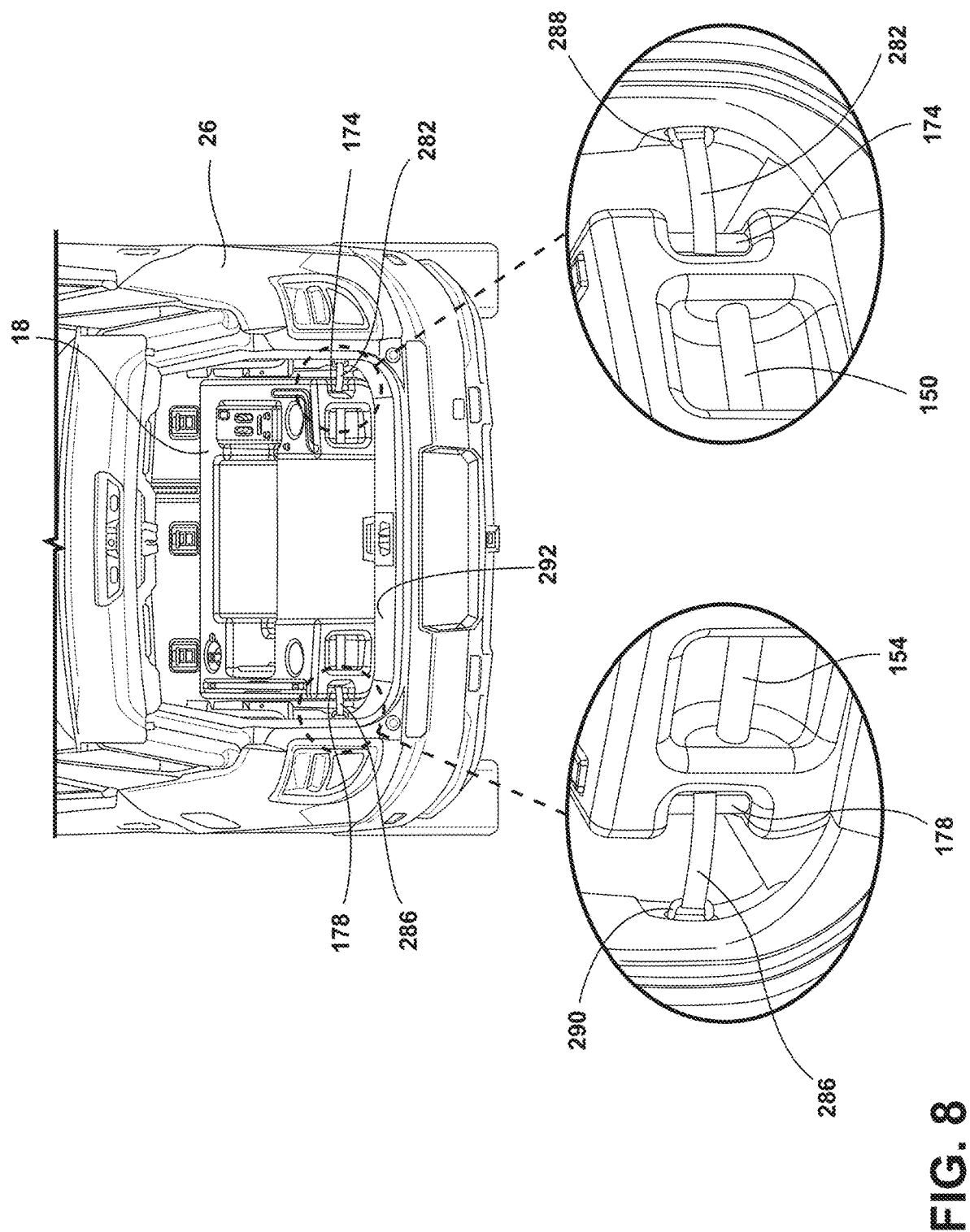
FIG. 8 is a rear perspective view of the container disposed in the vehicle cargo area and a fastener extending between the vehicle cargo area and the container, according to an aspect of the disclosure.

Referring to FIG. 8, the container 18 is shown secured to the vehicle 26. Fasteners 282, 286 may extend from the vehicle 26 to the container 18. The vehicle attachments may include C-hooks 288, 290. The fasteners 282, 286 may extend from the substantially vertical fixing tubes 174, 178 to the C-hooks 288, 290. The fasteners 282, 286 may include hook and loop attachments disposed on a strap. A variety of fasteners may be used with the present disclosure. In the example shown, the fasteners 282, 286 may extend from the fixing loops 142, 146 anchored to the vehicle body to the substantially vertical fixing tubes 174, 178 on the container 18. The container 18 may be disposed on the floor 22 and behind the upward projection 292 of the vehicle body 294. The upward projection 292 of the vehicle body and the seatback 46 in the upright position, together with the fastener, may limit the fore and aft movement of the container 18 within the vehicle 26. The fasteners 282, 286 may be fastened to the substantially vertical fixing tubes 174, 178 on the container 18. The substantially horizontal fixing tubes 150, 154 and the substantially vertical fixing tubes may serve as handles for moving and carrying the container 18. Fixing tubes may be disposed on the carrier in various orientations in addition to the substantially vertical orientation of substantially vertical fixing tubes 174, 178 and the substantially horizontal orientation of substantially horizontal fixing tubes 150, 154.

Referring to FIGS. 9A-9B, the second container portion 74 is shown with the pump module 54. The lever 276 may attach the handle 274 to the pump module 54. The handle 274 may be turned in the direction shown by arrow 298 to manually activate the pump 52 disposed in the pump module 54. The pump module 54 may be coupled to the container 18 with the coupling tube 302. The pump module 54 may draw water into the container 18 or expel water from the container 18 through the coupling tube 302. A pump hose 306 may be coupled to the pump module 54. The pump hose 306 may be disposed in a pump hose channel in the 308 in the pump module 54. The pump hose 306 may draw water into and expel water from the pump module 54.

Figures 10A, 10B:
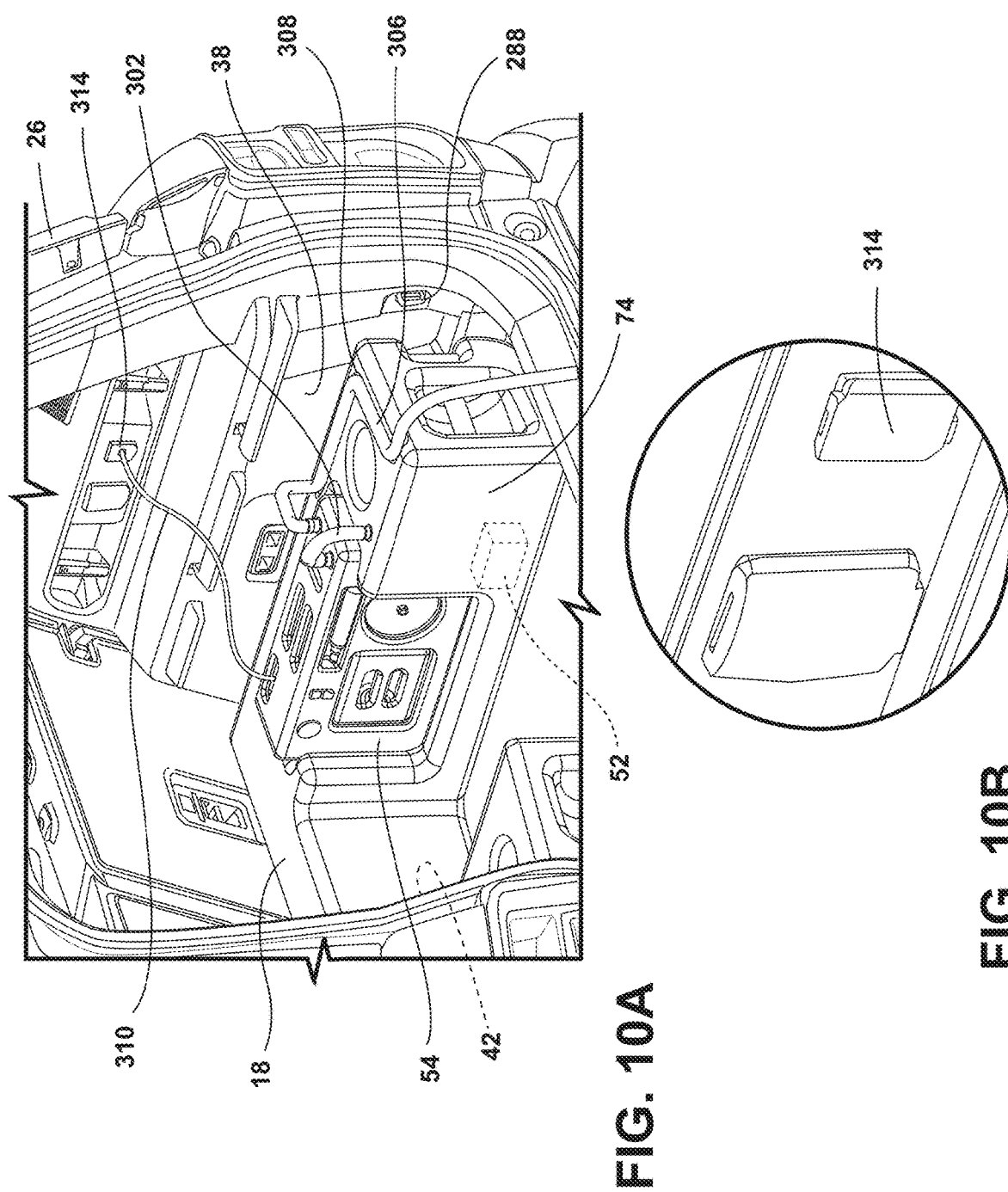
FIG. 10A is a side perspective view of the pump module configured to operate electrically through power outlets in a vehicle cargo area, according to an aspect of the disclosure.
FIG. 10B is a side perspective view of the power outlets of disposed in the vehicle cargo area of FIG. 10A, according to an aspect of the disclosure.

With reference to FIGS. 10A-10B, the pump module 54 may be powered from a power source (for example, the vehicle battery) disposed in the vehicle 26. A power cord 310 may extend from the pump module 54 to a power outlet 314 disposed on the vehicle wall.

With reference to FIGS. 11A-11B, the pump module 54 may be powered from the stand-alone power source 58 stored in the pump module 54.

Figure 12A:
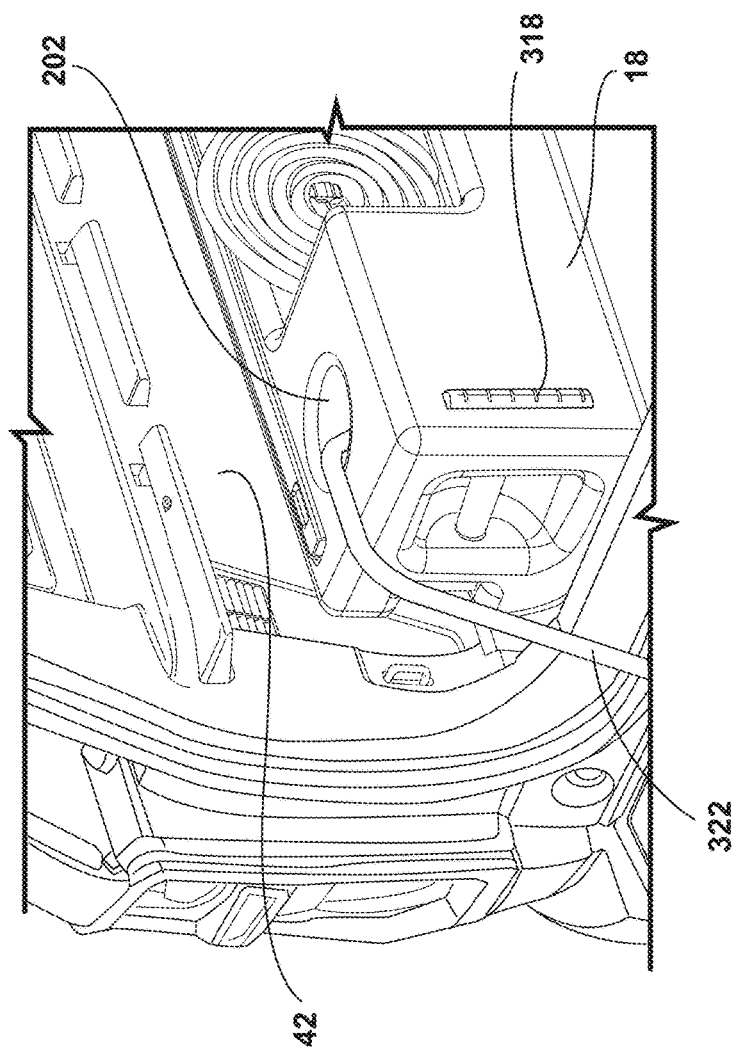
FIG. 12A is a side perspective view of a water level indicator on a container in a vehicle cargo area, according to an aspect of the disclosure.
Figure 12B:
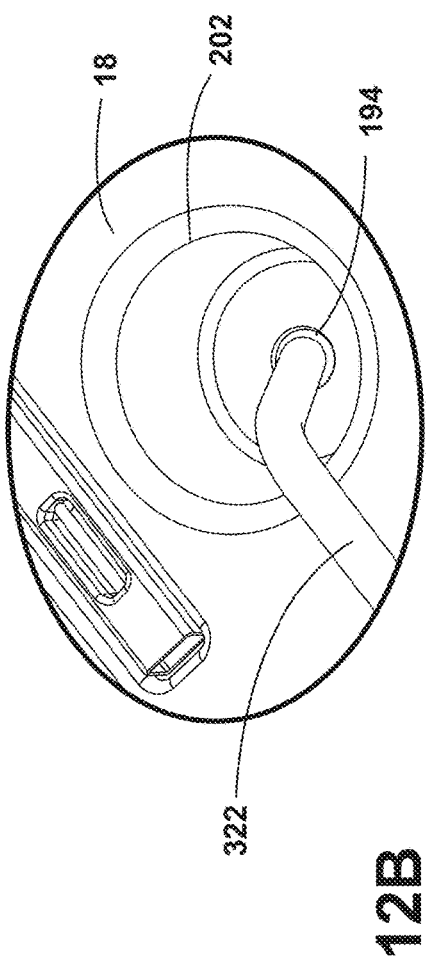
FIG. 12B is a top perspective view of an inlet disposed on the container of FIG. 12A, according to an aspect of the disclosure.

Referring to FIGS. 12A-12B, water level indicator 318 may be disposed on the container 18. The water level indicator 318 may be transparent. The water level indicator 318 may display the level of the water in the container 18. An inlet/outlet hose 322 is shown attached to the container 18. The inlet/outlet hose 322 may be attached to the port 194 disposed in the conical depression 202.

Figure 12C:
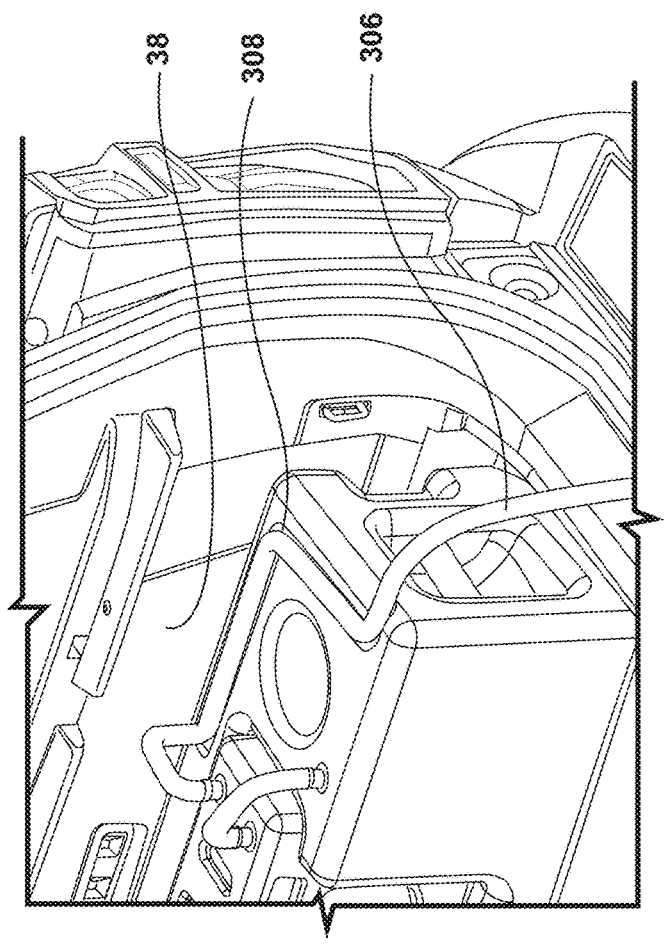
FIG. 12C is a side perspective view of the pump module connected to the container and pumping water, according to an aspect of the disclosure.
Figure 12D:
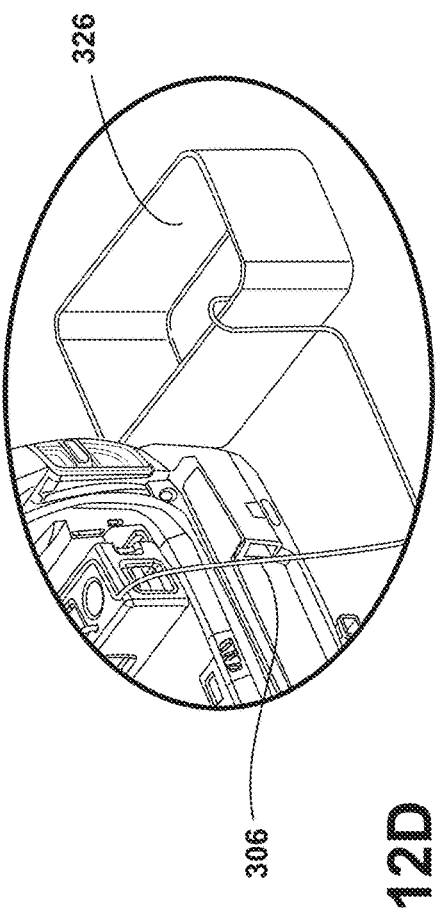
FIG. 12D is a side perspective view of the pump module connected to the container and pumping water from a water source into the container, according to an aspect of the disclosure.
Figure 13A:
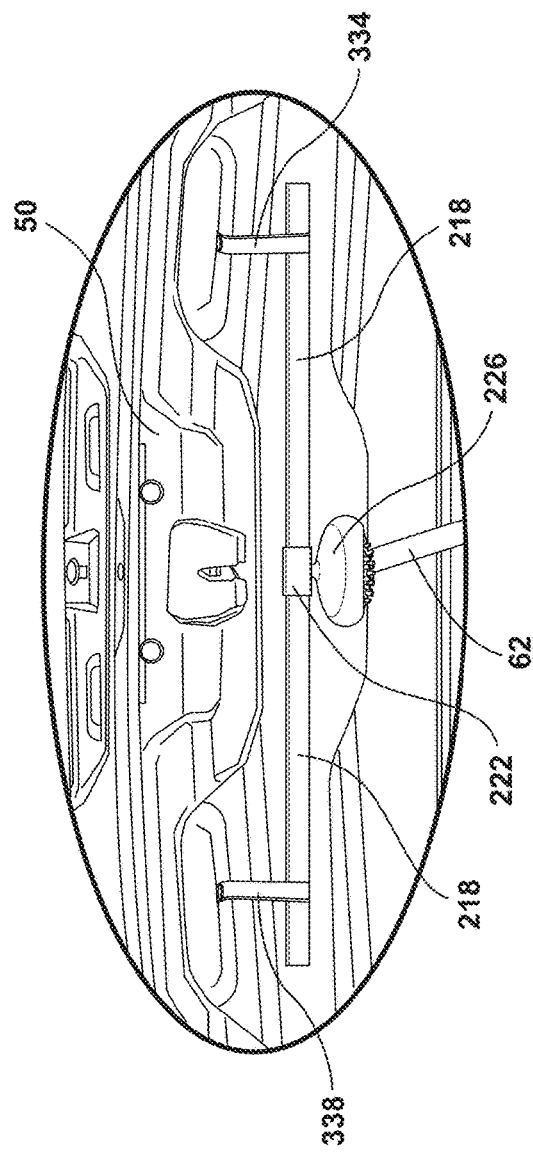
FIG. 13A is a bottom perspective view of a tailgate in the open position and a shower assembly coupled to the tailgate, according to an aspect of the disclosure.
Figure 13B:
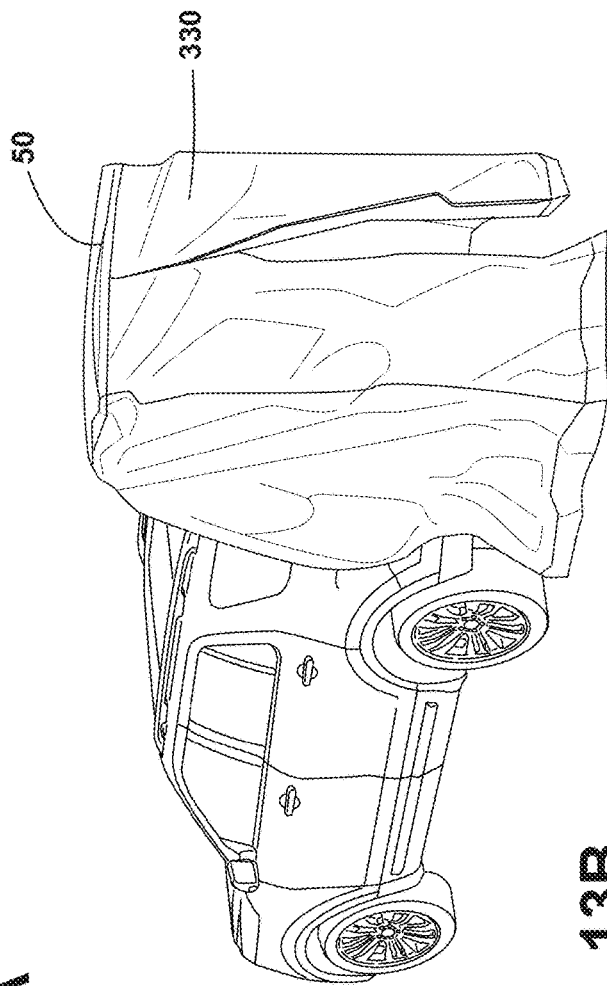
FIG. 13B is a side perspective view of a privacy barrier coupled to a cross member of the shower assembly, according to an aspect of the disclosure.
Figure 13C:
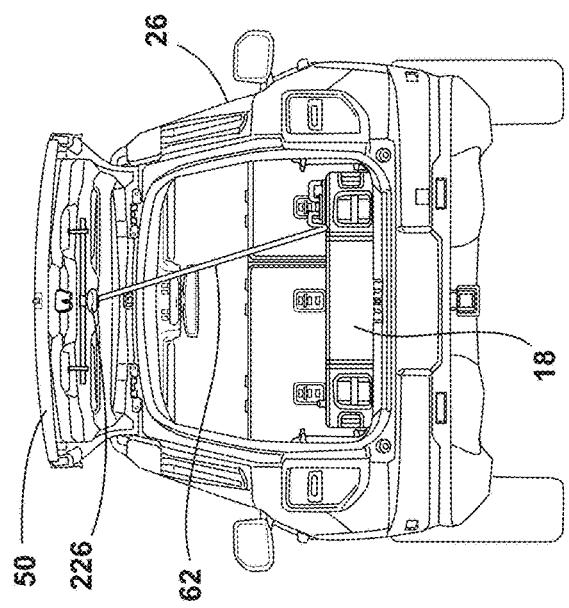
FIG. 13C is a rear plan view of the vehicle cargo area with a tube extending from the container to the inlet, according to an aspect of the disclosure.
Figure 13D:
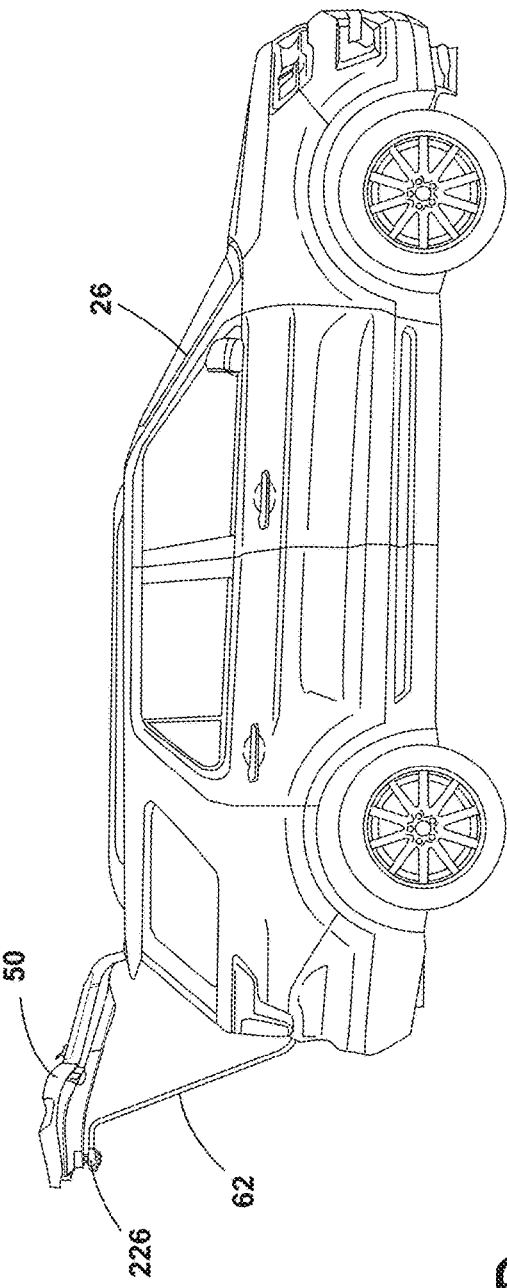
FIG. 13D is a side elevational view of a vehicle with the tailgate in the open position and a tube extending from to the inlet, according to an aspect of the disclosure.

Referring to FIGS. 12C-12D, a pump hose 306 may extend to a tub 326 disposed outside of the vehicle 26. The pump module 54 may pump water from the container 18 into the tub 326. The pump module 54 may pump water from the tub 326 into the container 18.

Referring now to FIGS. 13A-13D, the shower assembly 66 may be coupled to the tailgate 50. Suspenders 334, 338 may suspend the cross member 218 from the tailgate 50. A shower hose 62 may be coupled to the inlet of the shower head 226 to supply water to the shower head 226. The cross member 218 may be suspended from fixing tubes 342, 346 disposed in the tailgate 50. A privacy barrier 330 may be disposed around the edge of the tailgate 50. The privacy barrier 330 may be a curtain. The privacy barrier 330 may form an enclosure around a user while the user is taking a shower. The privacy barrier 330 may be attached to the tailgate 50 and/or another vehicle location. The privacy barrier 330 may be detached from the tailgate 50 and/or other vehicle location. The pump 52 may be activated to pump water from the container 18 to the shower head 226.

Referring to FIG. 14, the container 18 may include the conical depressions 198, 202 proximate the ports 190, 194. The conical depressions 198, 202 may function as storage areas. In the example shown, the conical depressions 198, 202 may function as cup holders. A cup 350 is shown disposed in the conical depression 198.

Referring to FIG. 15, the pump module 54 may perform functions in addition to pumping water. The pump module 54 may be used to pump pressurized air. For example, camping gear such as an air mattress or a soccer ball may be inflated through a hose coupled to a connector 354 of the pump module 54. In some examples, the connector 354 may be removable. The connector 354 may be one example of a connector that may be stored in the receptacle 230. The connector 354 may be part of a hose outlet connectors kit that may be stored in the receptacle 230. In some examples, camping gear such as an air mattress or a soccer ball may be directly coupled to a removable connector 354 of the pump module to inflate the air mattress or the soccer ball. Another feature of the disclosure may be the portable power bank that may be removable from the pump module 54. The power bank may be used to power camping gear (for example, lights and coffee makers).

Figure 16A:
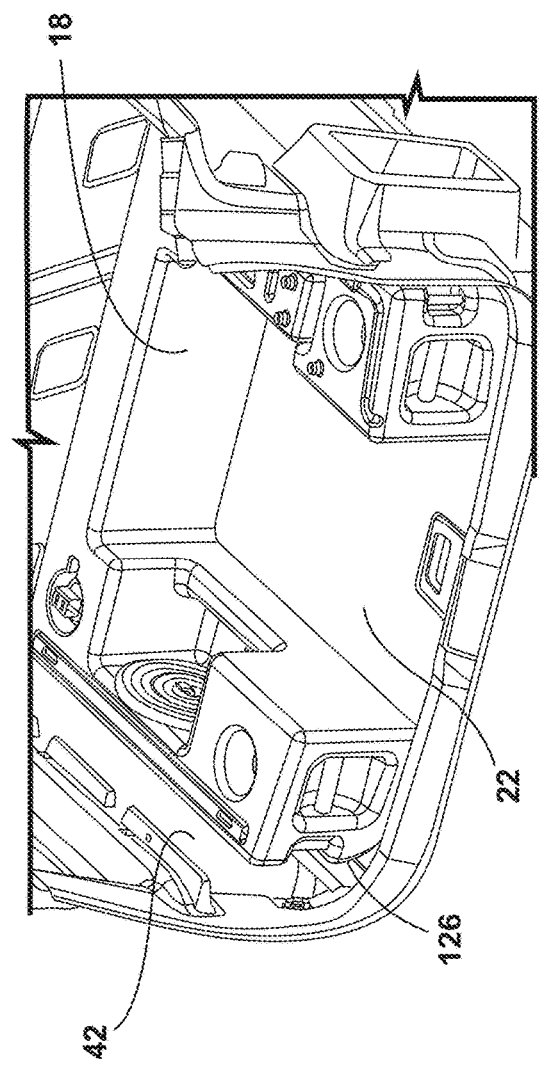
FIG. 16A is a rear perspective view of the container disposed in a vehicle cargo area, according to an aspect of the disclosure.
Figure 16B:
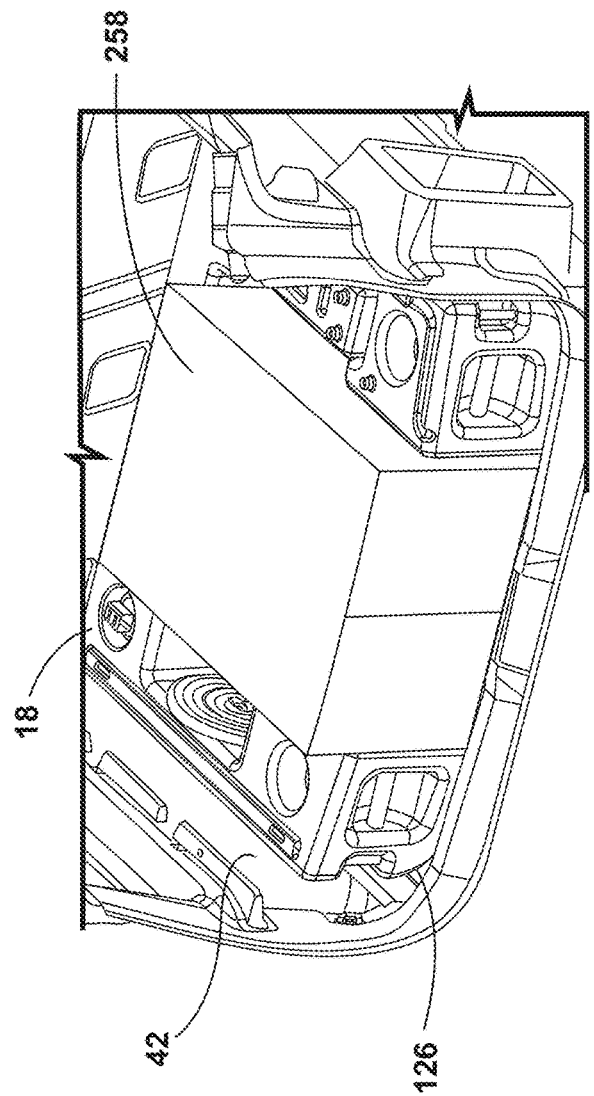
FIG. 16B is a rear perspective view of the container disposed in a vehicle cargo area and cargo disposed in a cargo storage space in the container, according to an aspect of the disclosure.

Referring to FIGS. 16A and 16B, in the example shown, the container 18 may store up to 74 liters of water. In the example shown, when the container 18 disposed in the vehicle cargo area 14, approximately 100 liters of free packaging space may be present in the vehicle cargo area 14. Exemplary cargo (box 258) is shown disposed on the floor 22 surrounded by the container 18.

With reference to FIGS. 1-16B, a storage system 10 for a fluid includes a vehicle cargo area 14 defined by a floor 22, a pair of opposing walls 38 and 42, a substantially vertical structure (for example, seatback 46), and a projection (for example, upward projection 292) disposed proximate an opening of the vehicle cargo area 14. A container 18 is disposed on the floor 22 and extends between the substantially vertical structure (for example, seatback 46) and the projection (for example, upward projection 292). The container 18 further extends between the pair of opposing walls 38 and 42. A pair of attachment assemblies 30 and 34 may extend between the container 18 ad each of the pair of opposing walls 38 and 42.

It is to be understood that the container 18 may be used to store a variety of liquids. Additionally, the container 18 may be used for other storage purposes, such as for dry items.

A variety of advantages may be achieved by use of the present disclosure. These advantages include having a modular container 18 whose structure provides for management of water accessories such as the shower assembly 66 and the pump module 54. The container 18 may provide cup holders in the conical depressions 198, 202 disposed proximate the ports 190, 194. Additionally, the storage container 18 may be packaged efficiently and securely within the vehicle cargo area 14. The storage container 18 may at least partially surround a space for storing cargo.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A fluid storage system for a vehicle cargo area comprising:
    a container including:
        a first container portion; and
        a second container portion orthogonal to the first container portion, wherein both the first container portion and the second container portion are configured to store a fluid;
    an attachment assembly including:
        a container attachment affixed to the container; and
        a vehicle attachment affixed to a vehicle; and
    a shower assembly coupled to the container, the shower assembly comprising:
        a shower head;
        a shower hose; and
        a cross member, wherein the cross member is configured to selectively couple to a tailgate of the vehicle.

2. The fluid storage system for a vehicle cargo area of claim 1, further comprising:
    a third container portion orthogonal to the first container portion, wherein the first container portion comprises a first container volume, the second container portion comprises a second container volume, and the third container portion comprises a third container volume, and further wherein a majority of the first, second, and third container volumes is configured to store the fluid.

3. The fluid storage system for a vehicle cargo area of claim 2, wherein the second container portion extends away from the first container portion in a second direction and wherein the third container portion extends away from the first container portion in a third direction.

4. The fluid storage system for a vehicle cargo area of claim 3, wherein the second direction is substantially parallel to the third direction.

5. The fluid storage system for a vehicle cargo area of claim 4, wherein the first, second, and third container portions have substantially rectangular cross-sections.

6. The fluid storage system for a vehicle cargo area of claim 4, wherein the first container portion, the second container portion, and the third container portion are arranged in a U-shaped configuration.

7. The fluid storage system for a vehicle cargo area of claim 6, wherein the first container portion is disposable against a seatback.

8. The fluid storage system for a vehicle cargo area of claim 6, wherein the container attachment includes a fixing tube.

9. The fluid storage system for a vehicle cargo area of claim 8, wherein the vehicle attachment includes a C-hook.

10. The fluid storage system for a vehicle cargo area of claim 4, wherein the first container portion, the second container portion, and the third container portion are fluidly connected.

11. The fluid storage system for a vehicle cargo area of claim 1, further comprising:
  a pump module coupled to a pump module recess in the container, the pump module comprising:
    a pump;
    a pump hose; and
    a stand-alone power source.

12. A fluid storage system for a vehicle cargo area comprising:
  a container including:
    a first container portion; and
    a second container portion orthogonal to the first container portion, wherein both the first container portion and the second container portion are configured to store a fluid; and
  an attachment assembly including;
    a container attachment affixed to the container; and
    a vehicle attachment affixed to a vehicle wherein the container defines at least one conical depression, the at least one conical depression defining a port, wherein the fluid is received by and withdrawn from the port.

13. The fluid storage system for a vehicle cargo area of claim 1, further comprising:
  a privacy barrier selectively attachable to the tailgate of the vehicle.

* * * * *